United States Patent
Nakajima et al.

(10) Patent No.: US 6,944,515 B2
(45) Date of Patent: Sep. 13, 2005

(54) PARTS LIST SYSTEM WHICH GENERATES AND MANAGES A PARTS LIST SIMPLY AND EFFECTIVELY

(75) Inventors: Mamoru Nakajima, Saitama (JP); Masataka Yamamoto, Saitama (JP); Naoki Saitou, Saitama (JP); Katsunori Taguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/385,380

(22) Filed: Mar. 10, 2003

(65) Prior Publication Data

US 2003/0182152 A1 Sep. 25, 2003

(30) Foreign Application Priority Data

Mar. 25, 2002 (JP) ........................... 2002-084436

(51) Int. Cl.[7] .............................................. G06F 17/30
(52) U.S. Cl. ............................ 700/105; 700/182; 707/8
(58) Field of Search ................. 700/95–97, 103–107, 700/115, 116, 180, 182; 703/1; 705/28, 29; 707/8–10, 100, 104.1, 201–203; 715/964, 968

(56) References Cited

U.S. PATENT DOCUMENTS

| | | | |
|---|---|---|---|
| 5,777,877 A | 7/1998 | Beppu et al. .................. 700/97 |
| 5,822,210 A | 10/1998 | Kobayashi et al. ......... 700/121 |
| 5,838,965 A | 11/1998 | Kavanagh et al. ...... 707/103 R |
| 5,864,875 A | 1/1999 | Van Huben et al. | |
| 6,256,549 B1 | 7/2001 | Romero et al. .............. 700/121 |
| 6,438,535 B1 * | 8/2002 | Benjamin et al. ............... 707/2 |
| 6,557,002 B1 * | 4/2003 | Fujieda et al. ............... 707/102 |
| 6,662,179 B2 * | 12/2003 | Benjamin et al. ............... 707/3 |
| 2001/0007997 A1 * | 7/2001 | Fujieda ....................... 709/229 |
| 2003/0212766 A1 * | 11/2003 | Giles et al. .................. 709/219 |
| 2004/0098292 A1 * | 5/2004 | Miller et al. .................... 705/8 |

FOREIGN PATENT DOCUMENTS

| | | |
|---|---|---|
| EP | 0 467 257 A2 | 1/1992 |
| GB | 2 364 801 A | 2/2002 |
| JP | 09-204449 | 8/1997 |
| JP | 10124550 A | 5/1998 |
| JP | 2002-073708 A * | 3/2002 |
| WO | WO 03/038688 A1 | 10/2002 |

* cited by examiner

Primary Examiner—Maria N. Von Buhr
(74) Attorney, Agent, or Firm—Carrier, Blackman & Associates, P.C.; Joseph P. Carrier; William D. Blackman (57) ABSTRACT

A parts list system includes a parts list database and a parts list control section. The parts list database stores a parts list of an apparatus. The parts list relates a part number of a part of the apparatus, part data indicating properties of the part, and a status data indicating each stage of a process of a design change. The parts list control section generates the status data based on the stage. The parts list control section makes a relation among the status data, the part number and the part data, and stores the status data in the parts list database. Then, the parts list control section controls operations of changes of the part number and the part data in the parts list, based on the status data.

19 Claims, 8 Drawing Sheets

| NUMBER | HIERARCHY | STATE | PART CONFIGURATION | ITEM/PART NAME | QTY | MATERIAL | BOARD THICKNESS | WEIGHT |
|---|---|---|---|---|---|---|---|---|
| | | | ⊞ F01 20000  16-1 | T/F TEST | | | | |
| 1 | | F | ⊞ F01 20001   16-2 | TEST | | | | 0.0 |
| 2 | | D | └ 20001-TGHA-A000 | TEST | | | | 0.0 |
| | | | └ 20001-TGHA-B000  16-3 | TEST | 2 | | | |
| 1 | | C | ⊞ F01 20002 | TEST | | | | 0.0 |
| 2 | | D | └ 20002-TGHA-A000 | TEST | | M | | 0.0 |
| 1 | | C | └ 20001-TGHA-ZZ00 | TEST | | | | 0.0 |
| | | | 20002-TGHA-ZZ00 | TEST | | | | |
| 1 | | C | ⊞ F01 20003 | TEST | | | | 0.0 |
| | | | └ 20003-TGHA-B000 | TEST | | | | |
| | | | └ 20001-TGHA-A000 | SPEC | | M | | 0.0 |
| 2 | | D | ⊞ F01 20004 | TEST | | | | |
| 1 | | F | └ 20004-TGHA-A000 | SPEC L1 | | | | 0.0 |
| 2 | | D | └ 2004Z-TGHA-ZZ00 | SPEC | | | | |
| 1 | | G | ⊞ F01 20005 | TEST | | | | 0.0 |
| 1 | | B | ⊞ F01 20005-TGHA-0000 | SPEC C | | | | 0.0 |
| 2 | | B | └ 2005Z-TGHA-ZZ00 | SPEC | | | | 0.0 |

PART NUMBER DISPLAY SECTION 11

CONFIGURATION DATA DISPLAY SECTION 12

| STATUS A | STATUS B | STATUS C | STATUS D | FIGURE FLAG | TOTAL FLAG | STATE |
|---|---|---|---|---|---|---|
| 51 | 52 | 53 | 54 | 55 | 56 | 57 |

| NO | DWG NO | NAME | MATERIA | REMARK | SWG | SP | M. DWG | QTY | SP QTY A | SP QTY B |
|----|--------|------|---------|--------|-----|----|----|-----|---|---|
| 1 | | PART NAME | | | | x | | 1 | 1 | 1 |
| 2 | 00000-XX0A-0000 | PART NAME | | (C) | x | o | | 1 | 1 | 1 |
| 3 | 00000-XX0A-0000 | PART NAME | | | o | o | | 1 | 1 | 1 |
| 4 | | PART NAME | | | | x | | 1 | 1 | 1 |
| SET SHORT PART | | | | | | | | | | |
| 708 | 00000-XX0A-0000 | PART NAME | | (C) | x | o | | 1 | | * |
| 709 | 00000-XX0A-0000 | PART NAME | | | x | o | | 1 | | * |

44-1

44-2

44-3

| HB | NF | C | | | | |
|---|---|---|---|---|---|---|
| | 0000-XXXX-0000 | | FREE | | | |
| | 0000-XXXX-0000 | | | | | |
| | | | 01/JAN/08 | JB | | |
| | | | NAME | | | |
| | | | TEST E3R | | | |
| | | | BOTH LINES RED | | | |
| OC | XXX-X | | NWE DWG | | 00000-XXXX-0000 | |
| A3 | | | | | | |

PARTS LIST SYSTEM WHICH GENERATES AND MANAGES A PARTS LIST SIMPLY AND EFFECTIVELY

BACKGROUND OF THE INVENTION

1. Field of the Invention

The present invention relates to a system of a parts list that manages data of parts used in a product. More particularly, the present invention relates to a system that controls generating and managing a parts list, and linkage of it and other data.

2. Description of the Related Art

A parts list is known as a list to manage the data of the parts used for an apparatus that is constituted by a number of parts, such as an automobile and a motorcycle.

The part data includes the configuration of main-parts and sub-parts included in each item constituting the apparatus, the number of the parts, the data peculiar to the part such as a design change history of the part, the parts combination in the apparatus, the usage situation and the like. Here, a main-part is a part constituting the apparatus, and a sub-part is a part constituting the main-part.

The parts list manages the part data for each part.

In designing an apparatus such as an automobile provided with a number of complex parts, the parts are managed by using a parts list system. Here, the parts list system is the system for carrying out a data process with regard to the generation and the management of a parts list.

A conventional parts list system strictly carries out the management of the design change and its history of the parts in a parts list at a designing stage. For this reason, the data of the parts at the concept stage, which is the former stage of the designing stage, can not be directly used for the parts list at the designing stage. Thus, the data in the parts list at the concept stage can not be continuously transferred to the parts list at the designing stage. Consequently, the data of the parts can not be unitarily managed from the concept stage through the designing stage to the stage of the completion of the figure. That is, a designer, although generating and maintaining the data of the parts at the concept stage, needs to generate a new parts list so that the data is reflected in the parts list at the designing stage.

Also, the parts list at the concept stage is disclosed to only limited persons recognized as the important persons by the designer, since the data is not shared with other departments. The other designers and the persons in the other departments can not access it at that stage. They access the parts list from the designing stage. Thus, the consideration of contents and the generation of opinions and requests for them are started at that time. Hence, it takes a long time to reflect the opinion and the request to the parts list.

A technique is desired which can unitarily manage the data of the parts from the concept stage to the stage of the completion of the figure. A technique is desired which can obtain wide opinions from persons concerned in a development at suitable timings.

SUMMARY OF THE INVENTION

Therefore, an object of the present invention is to provide a parts list system wherein it is possible to transfer data in the parts list at a concept stage continuously to the parts list at a designing stage and then use it.

Another object of the present invention is to provide a parts list system that enables persons related to a development of an automobile to share data in the parts list at the concept stage.

Still another object of the present invention is to provide a parts list system that can disclose data regarding the development to persons related to the development, and can obtain wide opinions from those persons at suitable timings.

In order to achieve an aspect of the present invention, the present invention provides a parts list system including a parts list database and a parts list control section.

The parts list database stores a parts list of an apparatus. The parts list relates a part number of a part of the apparatus, part data indicating properties of the part, and a status data indicating each stage of a process of a design change.

The parts list control section generates the status data based on the stage. The parts list control section makes relation among the status data, the part number and the part data, and stores the status data in the parts list database.

Then, the parts list control section controls operations of changes of the part number and the part data in the parts list, based on the status data.

The parts list system of the present invention further includes a CAD figure control section.

The CAD figure control section generates or modifies a CAD figure of the part based on data regarding the design change. The CAD figure control section extracts the part number and attribute data indicating properties of the part. The CAD figure includes the part number and the attribute data.

Then, the parts list control section makes the part data in the parts list database include the extracted attribute data, which is related to the part number.

The parts list system of the present invention, wherein the stage includes the stage of modifying a design of the part, the stage of inspecting the CAD figure, the stage of inspecting the part number and the stage of formalizing the design change.

Then, the parts list control section permits, limits or prohibits operations of changing the part number or the part data, based on the status data.

The parts list system of the present invention, wherein the parts list control section generates the status data based on a combination of a plurality of data indicating statuses of the process of the design change.

The parts list system of the present invention further includes a display section.

The display section displays the parts list in a display.

Then, the parts list control section controls the parts list to be displayed as a tabular form in the display, and controls the part number, the status data and the part data of the part to be displayed in one row in the tabulated parts list.

In the parts list system of the present invention, the part data of the parts list are related to the CAD figure data by the part number.

In order to achieve another aspect of the present invention, the present invention provides a parts list generating method including the steps of (a) to (c).

The step (a) modifies a CAD figure of a part of an apparatus based on data regarding a design change. The CAD figure includes a part number of the part and attribute data indicating properties of the part;

The step (b) extracts the part number and the attribute data based on the CAD figure, and stores the attribute data at places of a parts list related to the part number. The parts list relates the part number, part data including the attribute data and indicating properties of the part, and a status data indicating each stage of a process of a design change of the part of the apparatus.

The step (c) inspectes the CAD figure for satisfying a predetermined requirement and changes the status data of the part in the parts list to a first status when the CAD figure satisfies the predetermined requirement. The first status indicates that a deletion of the part number in the parts list is prohibited.

The parts list generating method of the present invention further includes the steps of (d) to (e).

The step (d) confirms a relation between the part and an item which is equipment of the apparatus including the part. The relation is indicated in an application data included in the part data.

The step (e) changes the status data of the part in the parts list to a second status. The second status indicates that a change of the application data in the parts list is prohibited.

The parts list generating method of the present invention further includes the steps of (f) to (g).

The step (f) group the part and other parts different from the part. A group of the part and the other parts is predetermined. CAD figures of the part and the other parts are inspected at the same time. The other parts have already finished the steps of (a) to (e).

The step (g) changes the status data of the part in the parts list to a third status. The third status indicates that a deletion, an addition and a change of the part number in the parts list is prohibited.

The parts list generating method of the present invention further includes the steps of (h) to (i).

The step (h) inspects part numbers of the part and the other parts included in the group for satisfying a predetermined rule.

The step (i) outputs the CAD figures of the part and the other parts for inspections and changes the status data of the part and the other parts in the parts list to a fourth status when the part numbers satisfy the predetermined rule. The fourth status indicates that the CAD figures of the part and the other parts are in the inspection.

The parts list generating method of the present invention further includes the step of (j).

The step (j) changes the status data of the part and the other parts in the parts list to a fifth status when the CAD figures of the part and the other parts pass the inspections. The fifth status indicates that the part, the other parts and the CAD figures of the part and the other parts are formally registered, and that a change of the part numbers or the CAD figures is prohibited.

The parts list generating method of the present invention, wherein the status data is generated based on a combination of a plurality of data indicating statuses of the process of the design change.

In order to achieve still another aspect of the present invention, the present provides a computer-readable medium having a computer program saved thereupon. The computer program includes the operations (a) to (c).

The operation (a) modifies a CAD figure of a part of an apparatus based on data regarding design change. The CAD figure includes a part number of the part an attribute data indicating properties of the part.

the operation (b) extracts the part number and the attribute data based on the CAD figure, and stores the attribute data at places of a parts list related to the part number. The parts list relates the part number, part data including the attribute data and indicating properties of the part, and a status data indicating each stage of a process of a design change of the part of the apparatus.

The operation (c) inspects the CAD figure for satisfying a predetermined requirement and changes the status data of the part in the parts list to a first status when the CAD figure satisfies the predetermined requirement. The first status indicates that a deletion of the part number in the parts list is prohibited.

According to the computer-readable medium of the present invention the computer program may further include the operations (d) to (e).

The operation (d) confirms a relation between the part and an item which is equipment of the apparatus including the part. The relation is indicated in an application data included in the part data.

the operation (e) changes the status data of the part in the parts list to a second status. The second status indicates that a change of the application data in the parts list is prohibited.

According to the computer-readable medium of the present invention the computer program may further include the operations (f) to (g).

The operation (f) groups the part and other parts different from the part. A group of the part and the other parts is predetermined and CAD figures of the part and the other parts are inspected at the same time. The other parts have already been processed in the operations (a) to (e).

The operation (g) changes the status data of the part in the parts list to a third status. The third status indicates that a deletion, an addition and a change of the part number in the parts list is prohibited.

According to the computer-readable medium of the present invention the computer program may further include the operations (h) to (i).

The operation (h) inspects part numbers of the part and the other parts included in the group for satisfying a predetermined rule.

The operation (i) outputs the CAD figures of the part and the other parts for inspections and changes the status data of the part and the other parts in the parts list to a fourth status when the part numbers satisfy the predetermined rule. The fourth status indicates that the CAD figures of the part and the other parts are in the inspection.

According to the computer-readable medium of the present invention the computer program may further include the operation (j).

The operation (t) (j) changes the status data of the part and the other parts in the parts list to a fifth status when the CAD figures of the part and the other parts pass the inspections. The fifth status indicates that the part, the other parts and the CAD figures of the part and the other parts are formally registered, and that a change of the part numbers or the CAD figures is prohibited.

According to the present invention computer-readable medium of the present invention the status data is generated based on a combination of a plurality of data indicating statuses of the process of the design change.

DESCRIPTION OF THE PREFERRED EMBODIMENTS

An embodiment of a parts list system of the present invention will be described below with reference to the attached drawings.

This embodiment is described by exemplifying a parts list used for designing an automobile. However, this may be applied to designing other apparatus provided with a number of parts.

Figure 1:
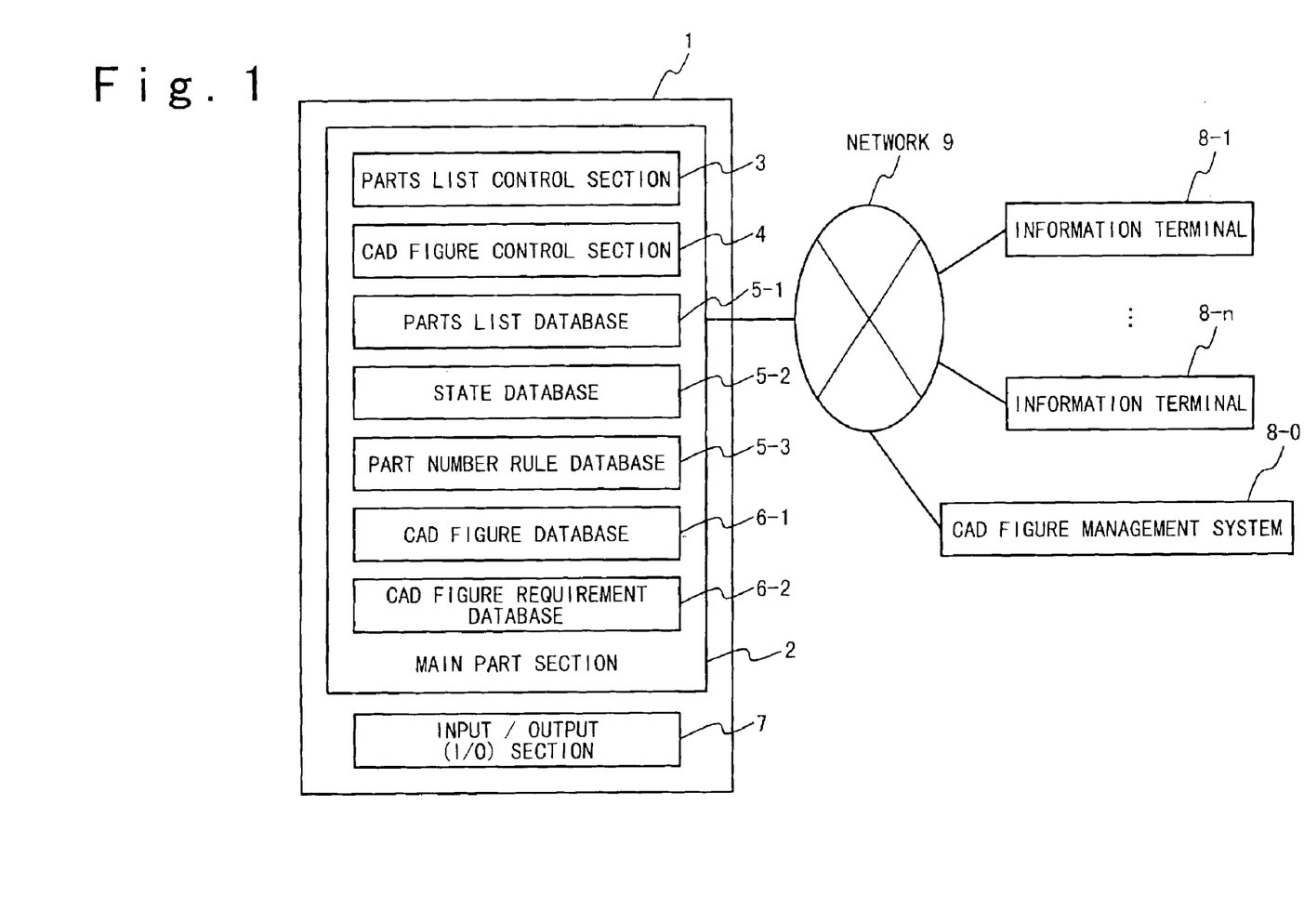
FIG. 1 is a view showing a configuration in an embodiment of a design system to which an electronic part list system of the present invention is applied.

FIG. 1 is a view showing the configuration in the embodiment of the automobile designing system, wherein the parts list system of the present invention is applied.

The automobile designing system includes a parts list system 1, and a CAD figure management system 8-0. They are connected each other in a two-way communication through a network 9. The information terminals 8-1 to 8-n (n=1, 2, . . . ) can access the parts list system 1 and the CAD figure management system 8-0 in a two-way communication through the network 9 and can use it.

Here, the parts list is the list generated, and used by an electronic method/an electronic apparatus like a computer. Each number of apart (hereafter, referred to as part number and PN) is individually assigned to each part used for an automobile. The data in the parts list are the part number and the rest of the data (hereafter, referred to as part data). The part data related to each part is related to the part number of the part.

The parts represented by the part numbers are divided into a plurality of groups for a plurality of items that constitutes the automobile. In each item, the parts are classified into a plurality of hierarchies, and arranged in a tree structure. For example, a part (a part number) of a first hierarchy is related to a relational tree of the first hierarchy. Also, a part of a second hierarchy constituting the part of the first hierarchy is related to a relational tree of the second hierarchy that is a lower order of the first hierarchy. Hereafter, they are similarly related.

In the present invention, for an item (set of parts) and a part, data indicating their states are added to the part lists. The state defines the stage in the development process of the item and the part. It is exemplified by a concept stage, a designing stage, a stage completing the CAD figure and so on. By using the state of the part, it is possible to clearly judge whether the part is at the concept stage or at the designing stage in the parts list. Thus, it is possible to recognize how the part data should be treated. It is important because the part data should be treated differently depending at which stage the part is. Then, it is possible to treat the part data of the part from the concept stage through the designing stage to the stage completing the CAD figure continuously in one parts list.

The parts list system 1 is a data processor exemplified as a workstation and a personal computer. It includes a main part section 2 and Input/Output (I/O) section 7.

The main part section 2 includes a parts list control section 3 and a CAD figure control section 4, serving as programs. It also includes a parts list database 5-1, a state database 5-2, a part number rule database 5-3, a CAD figure database 6-1 and a CAD figure requirement database 6-2.

The parts list control section 3 controls a change (a deletion, an addition and the like) for various data of the part in the parts list, based on the state data of the part. The parts list is stored in the parts list database 5-1.

Here, the state data indicates the state of the part. The state indicates the stage in the development process of the part. It is exemplified by a concept stage, a designing stage, a stage of checking the CAD figure, and a stage of completing the CAD figure and the like.

The parts list database 5-1 stores the parts list 5-1'. The parts list 5-1' is opened to the persons related to the development of the automobile. For example, engineers, persons in charge of a research, persons in charge of a technical evaluation, different designers, persons in charge of a purchase, persons in charge of a project, and the like. The opinion data, which is opinions to the parts list 5-1' from the related persons, can be obtained at the parts list 5-1' by the following methods. For example, allowing to write the opinion data only to a special region in the parts list 5-1', or attaching the file including the opinion data to the parts list 5-1', or establishing a link between the file including the opinion data and the parts list 5-1'.

The state database 5-2 stores statuses A to D, a figure flag and a total flag, and the state data while they are related to each other.

Here, the combinations of statuses A to D, a figure flag and a total flag indicate the state shown by the state data.

The part number rule database 5-3 stores the part number rules, which defines rules for making a part number.

The CAD figure control section 4 checks whether or not a CAD figure complies with the predetermined CAD figure requirement. It modifies the CAD figure, based on an input of a designer, when the CAD figure does not comply with the requirement. The figure is stored in a CAD figure database 6-1.

The CAD figure database 6-1 stores CAD data of parts specified by the part numbers. Also, it has the part position shape data the region table, which are explain later. Each CAD figure is related to each part number.

The CAD figure requirement database 6-2 stores a predetermined standard requirement of the CAD figures.

Here, the CAD figure comes from CAD data. The CAD data includes a part number, a CAD figure data (3D-figure), a title column data and a configuration part column data. The part number is a part number of a part to be drawn, and may be included in title column data. The CAD figure data (3D-figure) indicates three-dimensional figures of the part. The title column data indicates a title column of the CAD figure. The configuration part column data indicates a configuration part column of the CAD figure.

The Input/Output (I/O) section 7 is the equipment for input/output on the workstation and the personal computer. The keyboard and the mouse are the examples of the input section. The display and the printer are the examples of the output section.

The CAD figure management system 8-0 is a data processor exemplified as a workstation and a personal computer. It manages and permits the CAD figures of parts.

The information terminals 8-1 to 8-n (n=1, 2, . . . ) are exemplified as personal computers, and they are the data processing terminals that can access the parts list system 1 and the CAD figure management system 8-0. They are used by designers, engineers, persons in charge of a research, persons in charge of a technical evaluation, other designers, persons in charge of a purchase, persons in charge of PL (Product Line), persons in charge of a trial department, persons in charge of a test and the like.

The network 9 is a dedicated line exemplified as LAN (Local Area Network) or a communicable line, such as a public line and the like, exemplified as the Internet.

The designer can view the opinion data from the related person by accessing the parts list 5-1' because the opinion data is written in, is attached as a file to or is linked to the part list 5-1'. That is, the opinion data of the related person can be easily checked on the parts list 5-1'. Thus, it is possible to decrease the time and the labor, and also possible to reduce the possibility of an oversight.

Figure 2:
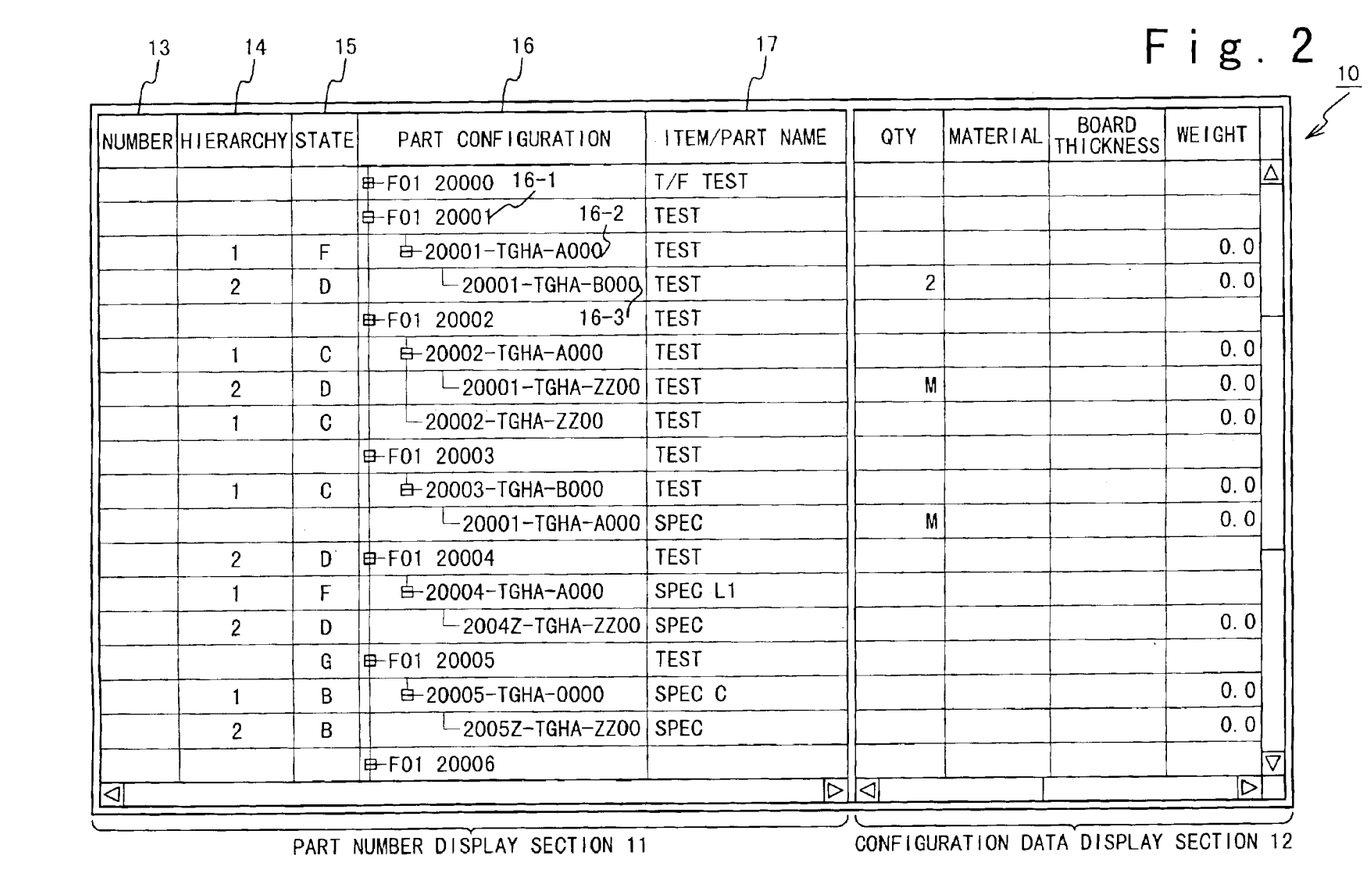
FIG. 2 is a view showing an example of a display screen of an electronic part list.

Next, the parts list will be explained below in detail with reference to FIG. 2. FIG. 2 is a view showing an example of a display screen displaying the parts list. A display screen 10 includes: a part number display section 11 having a number 13, a hierarchy 14, a state 15, a part configuration 16 and an item/part name 17; and a configuration data display section 12. The part data specified by one part number is placed in one column of the display screen 10.

The part number display section 11 displays the data to identify a part. The number 13 (No.) indicates a symbol, based on a predetermined rule. The hierarchy 14 (LVL) indicates the number showing the above-mentioned hierarchy. The state 15 indicates the state data as mentioned above. The part configuration 16 indicates an item and a part number of each hierarchy represented in a form of a relational tree structure, respectively. The item/part name 17 indicates names or class name or the like.

The configuration data display section 12 displays the parts application data, the part configuration data, the PN position shape link data of the part, the link to the other data and the like, for each part (each column)

The part configuration 16 has the relational tree structure as mentioned above. For example, in FIG. 2, below an item 16-1 (F01 20001), a part number 16-2 of a first hierarchy and a part number 16-3 of a second hierarchy are represented in the relational tree structure. The hierarchy of each part number is represented in the hierarchy 14.

Here, the parts application data indicates which part is used for the certain combination of equipment (a certain option). The part configuration data indicates the properties peculiar to a part, such as apart number, a part name, a number of parts, a material quality, a weight, a volume, a cost, a part analyzing method, a desirable parts manufacturer and the like. The PN position shape link data indicates the relation (linkage) between a part number and the part position shape data stored in the other database. A part position shape data indicates the position wherein a part is mounted in the automobile, the part shape and CAD figure (also referred to as a 3D (three-dimensional) data). The part position shape data is stored in the CAD figure database 6-1.

The data structure of the parts list will be described below with reference to FIG. 3.

Figure 3:
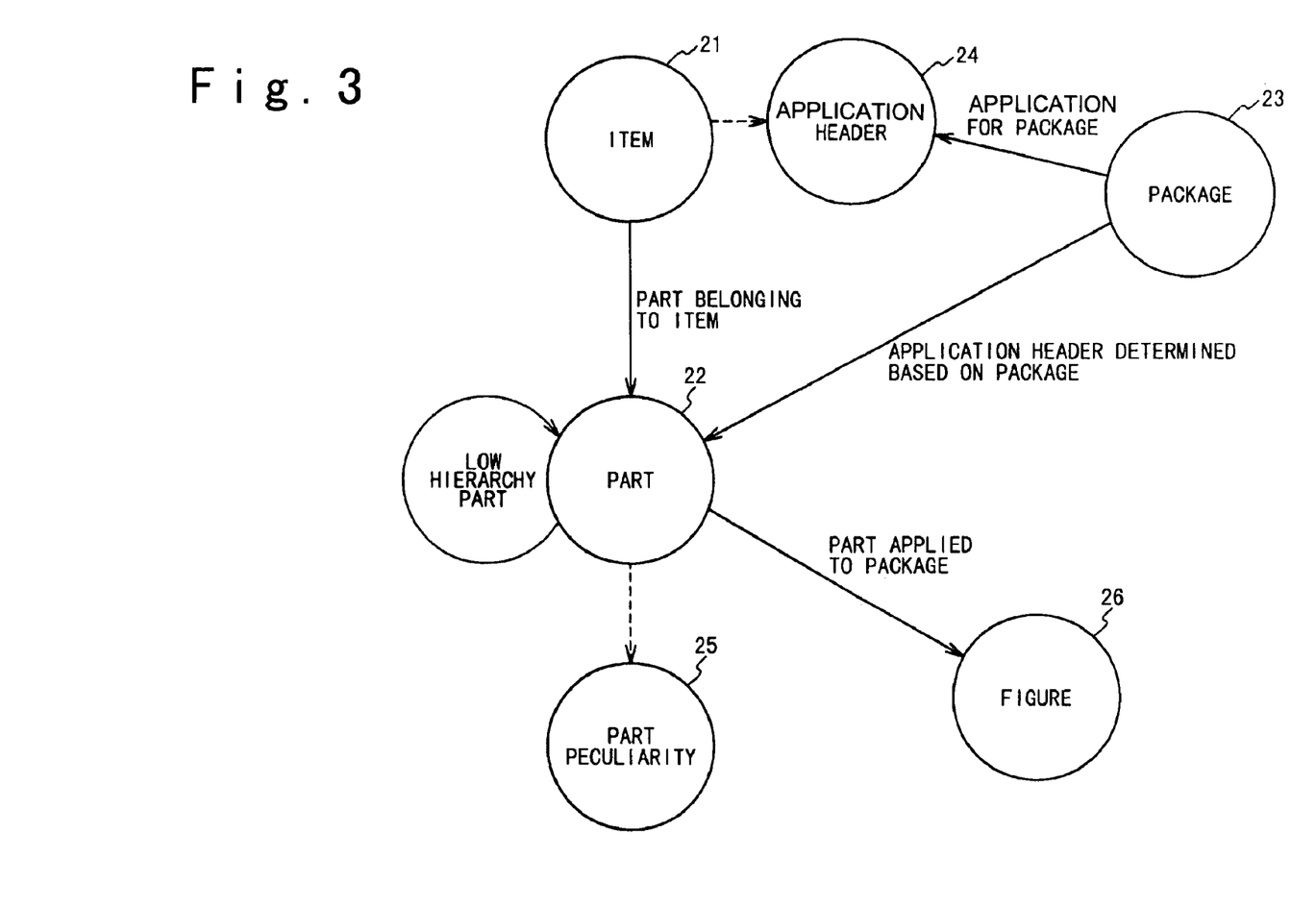
FIG. 3 is a view describing a data structure of an electronic part list.

FIG. 3 is a view describing the data structure of the parts list. The data of the parts list 5-1' is composed of the data having respective attributes of an item 21, apart 22, a package 23, an application header 24, a part peculiarity 25 and a figure 26. Each data have relations with other data such that is shown by arrows in FIG. 3.

The item 21 includes an item state data and an item data in which a part is included. The item state data indicates a state of an item such as a stage whether its data change or not. The item data corresponds to the item number of the part configuration 16 and the item name of the item/part name 17 in FIG. 2.

The part 22 includes a part number, a part state data, a figure flag, and a figure state data. The part state data indicates a state of a part such as a stage whether its data may be changed or not. The figure flag indicates a presence or absence of a CAD figure. The figure state data indicates a stage whether the figure is admitted or not. The part number data corresponds to the part number of the part configuration 16 and the part number name of the item/part name 17 in FIG. 2.

The package 23 includes the items and the part numbers composing a package (constituting a group of a set of figures. to be collectively inspected), a package state data, and a total flag. The package state data indicates a state of the package such as a stage whether its data may be changed or not. The total flag indicates a validation of the data of the item and the part number. The items and the part numbers of the package correspond to the CAD data in the CAD figure database 6-1 through the configuration data display section 12 in FIG. 2.

The application header 24 includes a derivative data showing a derivative model to which a part indicated by a part number is applied. The derivative data corresponds to the derivative model. The derivative models are models derived from the objective model. The derivative data is written in the configuration data display section 12 in FIG. 2.

The part peculiarity 25 includes data peculiar to a part which is related to the part number, such as a part configuration data and the like. The data corresponds to the configuration data display section 12 in FIG. 2.

The figure 26 includes a data of a figure of a part which is related to a part number and indicated by the part number. The data corresponds to the CAD data in the CAD figure database 6-1 through the configuration data display section 12 in FIG. 2.

The combination of the item state data, the part state data, the figure flag, the figure state data, the package state data, and a total check flag corresponds to the state 15.

The part 22, including the low hierarchy parts, has a relation to the item 21, such that the part 22 belongs to item 21. The part 22 has a relation to the part peculiarity 25 if the part has peculiar data. The part 22 also has a relation to the figure 26, such that the CAD figure (26) belongs to the part 22. The package 23 has a relation to the part 22, such that the part 22 is applied to the package 23. The package 23 also has a relation to the application header 24, such that the application header 24 is determined based on the package 23.

These data structures are exemplified by the data generated by using an object-oriented program and the relational database system. These data in the parts list 5-1' is not necessary in the one table (list). For example, tables, each of which includes some of the data of the parts list 5-1', have relations each other. Each table is related by the part number as a key, like the relational database system. In this case, the parts list 5-1' is the aggregation of all the tables.

The parts list, explained with reference to FIGS. 2 to 3 and stored in the parts list database 5-1, will be described below in detail. The parts list database 5-1 stores the parts list 5-1' (the data) shown in FIG. 4.

Figure 4:
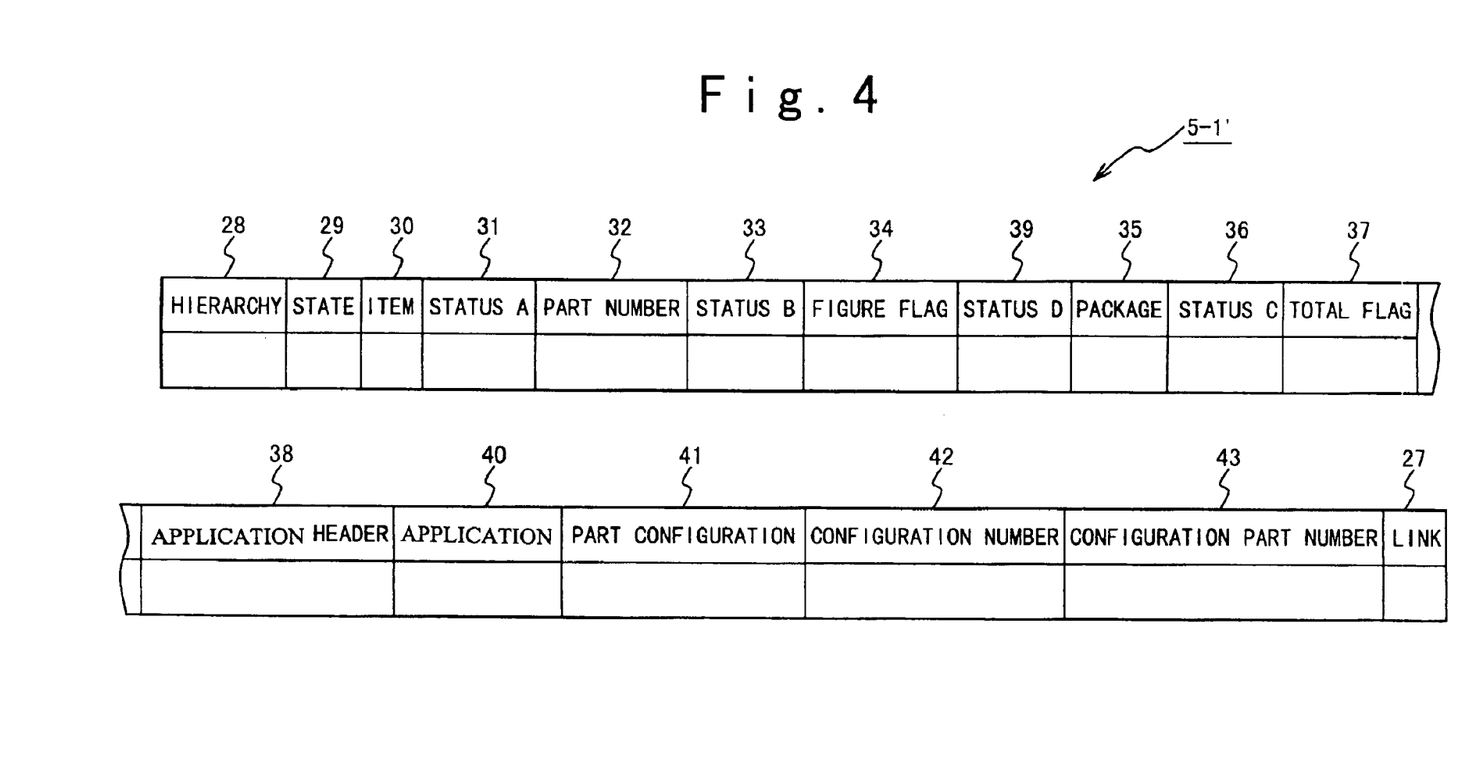
FIG. 4 is a view describing a part table database.

FIG. 4 is a view illustrating the parts list 5-1'. The parts list 5-1' has a hierarchy 28, a state 29, an item 30, a part number 32, a status A31, a status B33, a figure flag 34, a package 35, a status C36, a total flag 37, an application header 38, a status D39, an application 40, apart configuration 41, a configuration number 42, a configuration part number 43 and a link 27.

The hierarchy 28 corresponds to the hierarchy 14 in FIG. 2.

The state 29 corresponds to the state 15 in FIG. 2.

The item 30 is the item data as mentioned above at FIG. 3.

The part number 32 is the part number data as mentioned above at FIG. 3.

The status A31 indicates the item state data as mentioned above at FIG. 3, and indicates states a1 to a4.

The status B33 indicates the part state data as mentioned above at FIG. 3, and indicates states b1 to b3.

The figure flag 34 indicates the figure flag as mentioned above at FIG. 3.

The package 35 indicates the package as mentioned above at FIG. 3.

The status C36 indicates the package state data as mentioned above at FIG. 3, and indicates states c1, c2.

The total flag 37 indicates the total flag as mentioned above at FIG. 3.

The application header 38 indicates a derivative data as mentioned above at FIG. 3.

The status D39 indicates the figure state data as mentioned above at FIG. 3, and indicates a state d1.

The application 40 is the parts application data.

The part configuration 41 is the part configuration data.

The configuration number 42 indicates a kind of a figure on which this part is drawn.

The configuration part number 43 indicates apart number of apart (a sub-part) constituting this part (a main-part).

The link 27 is the data, such as the address, indicating link destinations with regard to other files, data, figures and the like.

Among the above-mentioned data, some of them are cited from the data of CAD figure as the attributed data included in the CAD data.

Figure 5:
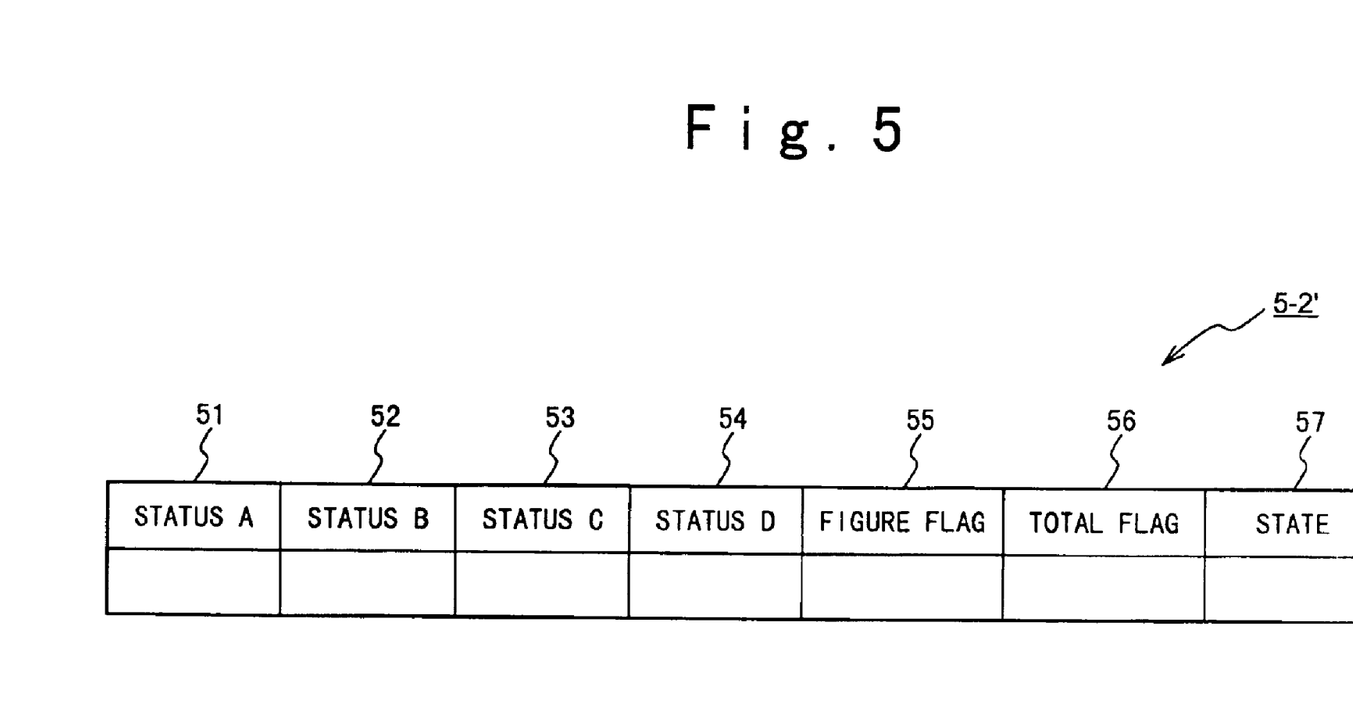
FIG. 5 is a view describing a state database.

Next, the state database 5-2 is described. A state judgment list 5-2' is stored in the state database 5-2. The state judgment list 5-2' is a table in which status A to status D as state indicative data, a figure flag, a total flag, and the state data are related.

FIG. 5 is a view illustrating the state judgment list 5-2' in the state database 5-2. The state judgment list 5-2' has respective data of a status A51, a status B52, a status C53, a status D54, a figure flag 55, a total flag 56 and a state 57.

Each of the statuses A51 to D54 corresponds to the status A31, the status B33, the status C36 and the status D39 of the parts list 5-1' of FIG. 4. Similarly, the figure flag 55 and the total flag 56 correspond to the figure flag 34 and the total flag 37 of FIG. 4, respectively.

The state 57 indicates the conditions (states) of the admission, the limitation and the inhibition with regard to the change of the data in FIG. 4. The state 57 is exemplified such as the states 1 to 4. In this case, the state 1 indicates that the operation to change the part number 32 and the application 40 is admitted. The state 2 indicates that the operation to delete the part number 32 is not admitted. The state 3 indicates that the operation to change the application 40 is not admitted. The state 4 indicates that the operation to change/add/delete the part number 32 is not admitted.

Then, the state 57 is determined for a certain combination of the status A51, the status B52, the status C53, the status D54, the figure flag 55 and the total flag 56, in FIG. 5. Based on the determination, the state 29 in FIG. 4 is determined and then reflected in the state 15 in FIG. 2.

That is, the state 15 (state data) in FIG. 2 is determined based on the combination of the four states and the two flags as mentioned above. Based on the combination, the state 15 is judged as each of the stages exemplified as a concept stage (the state 1 in FIG. 5), a designing stage (the state 2 in FIG. 5), a figure output stage a (the state 3 in FIG. 5) and a figure output stage b (the state 4 in FIG. 5).

In the present invention, with regard to the item and the part, a data indicating its state (the state 29 in FIG. 4) is added to the parts list for each item and part. By checking the state of the part, it is easy to know what state (stage) the part is in. Even if the same parts list is referred to, using the state 29 related to the part number enables the allowable (executable) operation at each stage to be controlled, for each part discriminated by the part number. That is, the parts of the various states can be mixed within the same parts list.

Also, the data peculiar to the part in the parts list can be operated without any dependence on the stages of the state 29 of the parts list, by providing the attribute of the part peculiarity 25.

The display of the parts list as shown in FIG. 2 is one embodiment, and the present invention is not limited to this display.

The person referring to the parts list can always obtain the data of the part indicated by the part number. Here, the data includes not only the data within the file of the parts list but also the data related (linked) to the file (or the item, the part number) of the parts list. It is carried out by finding out a proper part number from the part number 16 in FIG. 2 and looking at its row (highlighted in FIG. 2).

Also, in the parts list, between the concept stage and the manufacturing stage of the automobile, the modification and the change of the part are carried out in many cases. However, their data is written to the file related to the parts list and the parts list itself. That is, the modification and the change of the part are reflected in the file at real time on each occasion. Thus, the concerned person can always know the newest situation of the development.

The parts list maybe generated for each classification or may be collectively generated for each model. Here, the classification implies a family (for example, a frame, an engine, a transmission and the like), a model (for example, a car model), a section (for example, a roof) and an item (for example, an airbag).

In this embodiment, "relation" of data includes the relation between files, the relation between data within a file and a different file, and, the relation between data within file and data within a different file. Then, it is at a state that the one of data/file can be called out from the other data/file. For example, there is a relation method of storing a location of the other file/data (for example, a database name, a path to a database and an address of data within a database) in one file/data and then calling out by using it. Also, there is a relation method of storing a name of a database in which the different file/data is stored together with a file name/part number and then calling out by using it, and the like. However, it is not limited to them.

It is possible to use an approach of a conventional relational database to thereby carry out the relation based on various keys.

The CAD figure will be described below with reference to FIG. 6.

Figure 6:
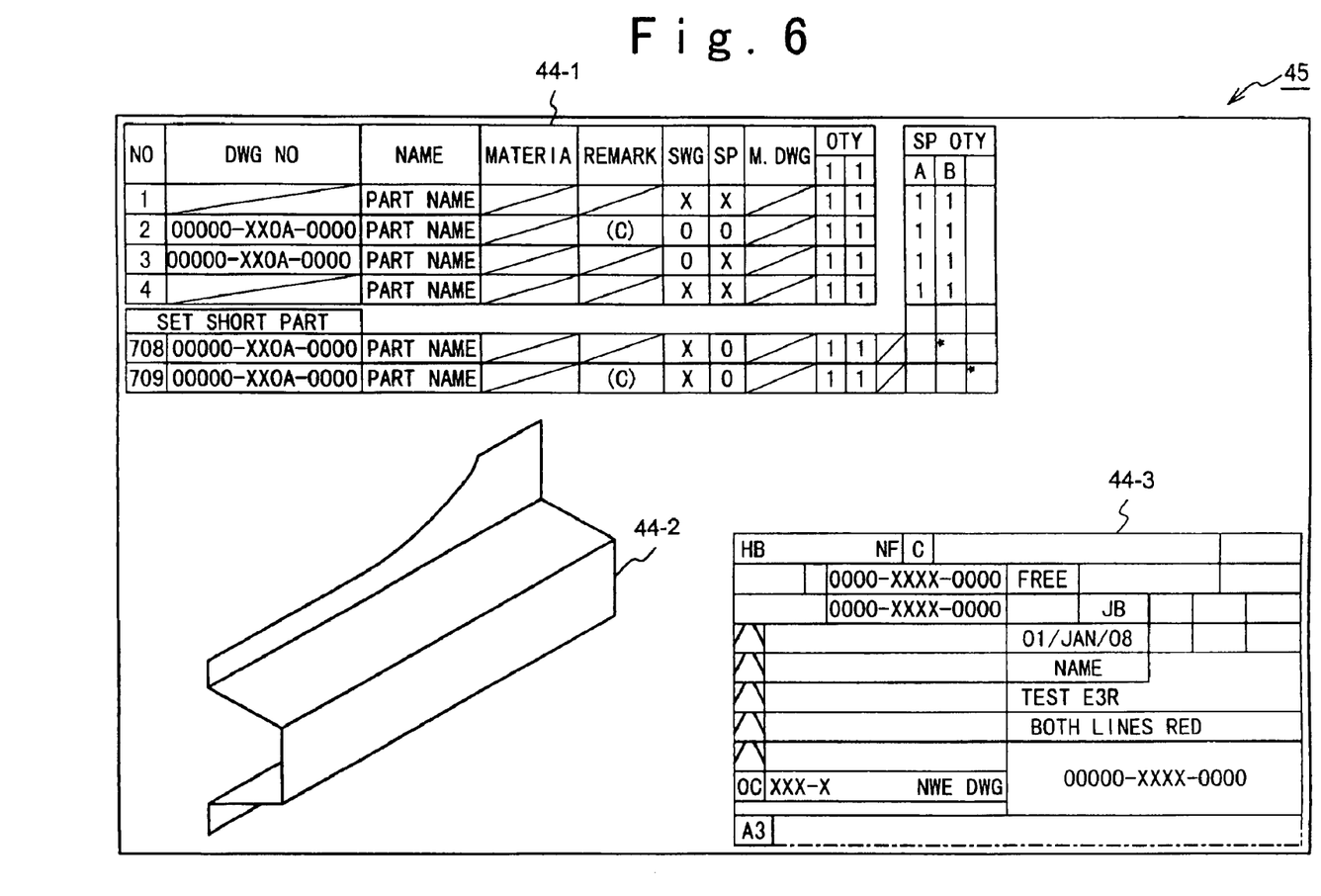
FIG. 6 is a view showing an example of a display screen of a figure.

FIG. 6 is a view showing a display example of a CAD figure on a display screen, based on the CAD data. A CAD FIG. 45 has a configuration part column region 44-1, a title column region 44-3 and a 3D-figure region 44-2. The configuration part column region 44-1and the title column region 44-3 include attribute data which indicate the attribute and properties of the part. The attribute data are included in part data of the parts list.

The configuration part column region 44-1 is the region in which the configuration part column is generated. The configuration part column mainly displays the configuration part (sub-part) column data. The sub-parts configure the main-part drawn on the CAD figure. The configuration part column data include a configuration number (a hierarchy of a part constituting a part drawn on the CAD figure), the sub-part numbers (configuration part number)/the sub-part names, and the like.

The title column region 44-3 is the region in which the title column is generated. The title column mainly displays the title column data of a main-part. The title column data include a part number of the main-part (a title part number), a part name, a design change number and the like, to specify a part drawn on the CAD figure.

The 3D-figure region 44-2 is the region in which a 3D-figure is generated. The 3D-figure region 44-2 mainly displays the CAD figure data (3D-figure) of the main-part and, in some cases, the sub-parts.

This embodiment describes the case of one title column and one part configuration column. However, the present invention is not limited to this case.

The method of extracting the attribute data in the title column and the configuration part column can use, for example, the following process. (1) Predetermining the regions in the CAD figure in which the title column region 44-3/the configuration part column region 44-1 are generated,and the particular element to be used for writing data on these regions (44-3, 44-1). The regions are specified by the sets of coordinates in the display screen. The sets of coordinates are included in the region table stored in the CAD figure database 6-1. The particular element is a symbol (character) or font to be distinguished from other data. (2) Finding out a data group composed of particular elements within the title column region 44-3/the configuration part column region 44-1, based on the region table. (3) Extracting the attribute data from a position of the particular elements in each data group. Here, the attribute data have been composed of the particular elements.

Figure 7:
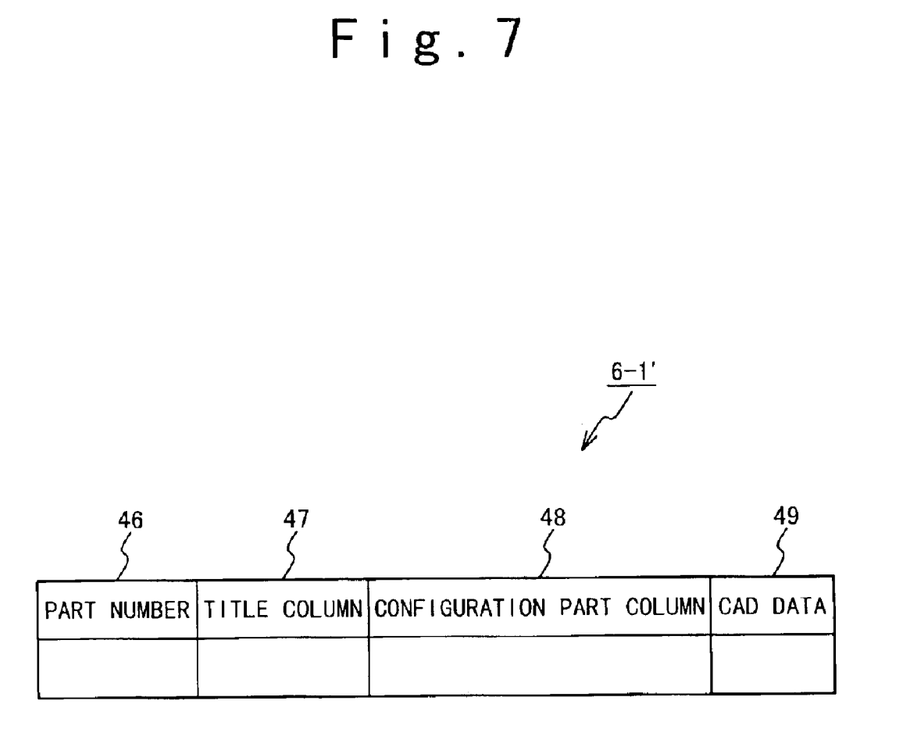
FIG. 7 is a view describing a figure database.

Here, the CAD data in the CAD FIG. database 6-1 is further explained.

FIG. 7 is a view explaining a CAD data. The CAD data 6-1' includes a part number 46, a title column 47, a configuration part column 48 and a CAD figure data 49.

The part number 46 indicates the part number data (=the title part number) of a part drawn on a CAD figure.

The title column 47 is the title column data, including attribute data, exemplified as a hierarchy, an item, a title part number, a part name and the like.

The configuration part column 48 is the configuration part column data, including the attribute data, exemplified as a configuration number, a configuration part number and the like.

The CAD figure data 49 is the CAD figure data of a part number 46. The CAD figure data 49 may be obtained from the design data of an already-designed other model or may be independently generated by the designer.

The display of the figure as shown in FIG. 6 is one embodiment. It is not limited to this display.

The attribute data of the title column 47 and the configuration part column 48 are related to the part data of the parts list 5-1' stored in the parts list database 5-1. The CAD figure control section 4 outputs the attribute data, which is modified according to the modification of the CAD data, to the parts list control section 3. The parts list control section 3 receives the data and modifies the parts list, if the parts list is in the allowable state.

The operation in the embodiment of the parts list system in the present invention will be described below with reference to the attached drawings.

Figure 8:
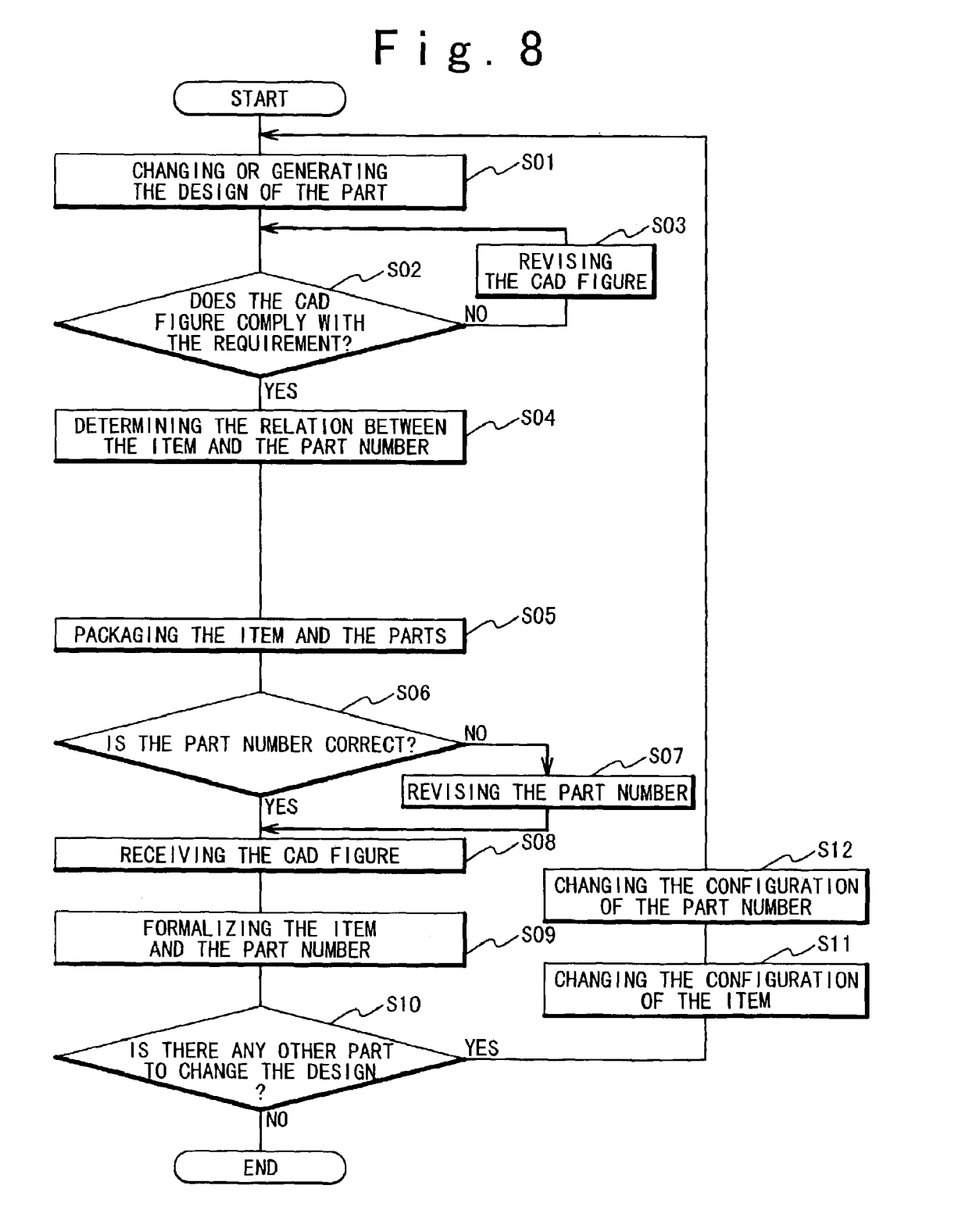
FIG. 8 is a flowchart showing an operation in an embodiment of an electronic part list system of the present invention.

FIG. 8 is a flowchart showing the operation in the embodiment of the parts list system in the present invention.
(1) Step S01.

The designer makes the concept data of the objective model of the automobile, based on the various data required for the design. The concept data includes ideas of the change or generation of the design of the part, the contents of the part in the parts list. Then, based on the concept data and the input of the designer, the CAD figure control section 4 generates or modifies the CAD figure of the part. After generating or modifying the CAD figure, the parts list control section 3 generates or modifies the parts list 5-1', based on the attribute data and the concept data, and the input of the designer if necessary.

At this stage, statuses A31/B33/C36 of the part in the parts list 5-1' are (or become) at a1/b1/c1. The combination of the statuses of a1/b1/c1 indicates that the data of the part can be freely changed, which is shown in the state judgment list 5-2'. It is indicated by the proper sign (or symbol) in the state 29 (and the display of the state 15). Here, status D39, the figure flag 34 and the total flag 37 are reset.
(2) Step S02

The CAD figure control section 4 inspects whether or not the CAD figure complies with the standard requirement of the CAD figures in the CAD figure requirement database 6-2.

The CAD figure is completed when it complies with the standard requirement.

Based on the completion of the CAD figure, the parts list control section 3 sets a figure flag of a figure flag 34 of the part of the parts list 5-1'.

The statuses A31/B33/C36 still remain at the a1/b1/c1. The combination of the statuses of a1/b1/c1 and the figure flag indicates that the deletion of the part number 32 and the part configuration 41 of the part are not permitted, according to the state judgment list 5-2'. It is indicated by the proper sign (or symbol) for the state 29 (and the display of the state 15).

After that, when the CAD figure is completed, the operational flow proceeds to a step S04. When the CAD figure does not comply with the standard requirement and the CAD figure is not completed, the operational flow proceeds to a step S03.
(3) Step S03

Since the CAD figure does not comply with the standard requirement of figures, the CAD figure control section 4 displays its fact and the content of the requirement that the CAD figure does not comply, for the designer.

The designer modifies the CAD figure to satisfy the requirement. The operational flow returns back to the step S02.

Here, the CAD figure control section 4 may have the program to modify the CAD figure automatically in order to comply with the standard requirement of the CAD figures.

In this case, the CAD figure is automatically corrected based on the standard requirement.

(4) Step S04

The parts list control section 3 determines the relation between the item 30 and the part number 32 of the part used therein in the parts list 5-1', based on the CAD figure. At the same time, it changes the statuses A31/B33/C36 to a2/b1/c1. The combination of the statuses of a2/b1/c1 and the figure flag indicates that the change of the application 40 (the parts application data of the configuration data display section 12) of the part is not permitted, from the state judgment list 5-2'. Here, also, the deletion of the part number 32 and the part configuration 41 are not permitted, as mentioned above. It is indicated by the proper sign (or symbol) for the state 29 (and the display of the state 15).

(5) Step SO5

Based on a plurality of part numbers in the part number 32 of the parts constituting the item 30, the parts list control section 3 writes these part numbers to the package 35. At the same time, the statuses A31/B33/C36 are changed to a2/b1/c2. The combination of the statuses of a2/b1/c2 and the figure flag indicates that the operation (the deletion, the change or the addition) of the part number 32 and the part configuration 41 of the part are not permitted, from the state judgment list 5-2'. Here, also, the change of the application 40 is not permitted, as mentioned above. It is indicated by the proper sign (or symbol) for the state 29 (and the display of the state 15).

Here, the item 30 corresponds to the package. However, the package may be constituted by the set of parts, which is not limited to each item. In this case, the designer determines the set of the part number 32 constituting a package. The CAD figures of the package are collectively inspected at a unit of the design change.

All parts in the package have finished the above steps of S01 to S05. Each of Steps S06 to S09 may be carried out for all parts in the package at the similar timing.

(6) Step S06

The parts list control section 3 inspects totally whether or not the part numbers are correct, with regard to the item 30 and the plurality of part numbers 32 packaged at the unit of the design change. The points of the inspection are as follows. (a) Whether or not the part number complies with the part number rules, which is stored in the part number rule database 5-3? (b) Whether or not the same part number or item number is used for two or more different parts or items? (c) Whether or not there is the part number of the lower hierarchy, which is the same as the part number of the higher hierarchy? (d) Whether or not the relation between main-part and its sub-parts is correct? (e) Whether or not the part in the package is contained in a different package?

The total inspection of the CAD figure is completed when there is no problem in the total inspection.

At this time, the parts list control section 3 sets the total flag of the total flag 37 of the part. However, the statuses A31/B33/C36 are still at the a2/b1/c2. The combination of the statuses of a2/b1/c2, the figure flag and the total flag indicates the completion of the total inspection of the part. This is indicated by the proper sign (or symbol) for the state 29 (and the display of the state 15), based on the state judgment list 5-2'.

After that, when the total inspection of the CAD figure is completed, the operational flow proceeds to a step S08. When there is a problem and the total inspection is not completed, the operational flow proceeds to a step S07.

(7) Step S07

Since there is a problem in the part number 32, the parts list control section 3 carries out the display indicating its fact and the problematic content, for the designer.

The designer modifies the part number of the CAD figure and the parts list 5-1', based on its content.

Here, the parts list control section 3 may have the program to modify the part number automatically in order to comply with the total inspection. In this case, the part number is automatically corrected based on above-mentioned inspection points.

(8) Step S08

The package composed of the set of the CAD figures is completed based on the end of the total inspection.

The parts list control section 3 out puts the CAD figures of the part for each package. The CAD figures are received by the CAD figure management system 8-0 belonging to the managing department of the design. At the same time, it changes the statuses A31/B33/C36 to a3/b2/c2. The combination of the statuses of a3/b2/c2, the figure flag and the total flag indicates the output of the CAD figures of the part. This is reflected in the state 29 (and the display of the state 15), based on the state judgment list 5-2'.

The designer also submits the printed CAD figures to the managing department.

(9) Step S09

Based on the data indicating the permission of the design change from the CAD figure managing system 8-0, the parts list control section 3 formalizes the item 30 and the part number 32. At this stage, the design change (or new design) is formally registered in the corresponding portion (the part) of the parts list 5-1' in the parts list database 5-1. It results in the situation that the change of the data regarding to the part in the parts list 5-1' is not permitted.

At this time, the parts list control section 3 sets the status D39 from nothing to d1. The statuses A31/B33/C36 are still at the a3/b2/c2. The combination of the statuses of a3/b2/c2/d1, the figure flag and the total flag indicates the formal registration of the design change in the corresponding portion (the part) of the parts list 5-1'. This is reflected in the state 29 (and the display of the state 15), based on the state judgment list 5-2'.

This state also indicates that the parts list control section 3 allows the operation (deletion, change or addition) of data corresponding to the new (or other) part number in the part number display section 11 and the parts application data in the configuration data display section 12.

(10) Step S10

If there is some other part requesting a design change in the parts list 5-1', the operational flow proceeds to a step S01. If not so, it is ended.

(11) Step S11

The parts list control section 3 changes the configuration of the item 30 (the item number) of the item, if it is necessary for the design change process, based on the input of the designer.

At this time, the parts list control section 3 changes the statuses A31/B33/C36 of the other part of the item under the design change process to a1/b1/c1. This is reflected in the state 29 (and the display of the state 15), based on the state judgment list 5-2'. Here, status D39, the figure flag and the total flag are reset.

(12) Step Sl2

The parts list control section 3 changes the configuration of the part number 32, if it is necessary for the design change process, based on the input of the designer.

At this time, the statuses A31/B33/C36 are still at the a1/b1/c1. The operational flow returns back to the step S01.

The designer executes this process, for all of the parts (and items) requesting the design changes.

At each of the steps in the above-mentioned process, based on the states (the combination of the statuses A31/

B33/C36/D39, the figure flag and the total flag), it is possible to discriminate between the states of the parts specified by the item 30 and the part number 32 (the concept stage, the figure checking stage, the totally checking stage, the figure output stage, the formalizing stage and the like).

Consequently, even if the part data at the concept stage is written to the parts list before the formalization, whether or not it is formal can be precisely grasped. That is, even if the part data with regard to the parts at the various stages are mixed and noted on the same parts list, from the state data, it is possible to execute the strict management of the respective part data.

Then, the usage of the same parts list enables the part data from the concept stage to the final determination to be unitarily managed.

In the present invention, the parts list is opened. Thus, the data related to the development can be opened (disclosed) to the persons concerned in the development. Hence, it is possible to widely obtain the opinions from the persons concerned in the development at the suitable timings.

Although thee has been described in detail what is the present embodiment of the invention, it will be understood by persons skilled in the art that variations and modifications may be made thereto without departing from the spirit or essence of the invention.

What is claimed is:

1. A parts list system comprising:
   a parts list database which stores a parts list of an apparatus, wherein said pats list relates a part number of a part of said apparatus, part data indicating properties of said part, and a status data indicating each stage of a process of a design change of a part; and
   a parts list control section which generates said status data based on each said stage, makes a relation among said status data, said part number and said part data, and stores said status data in said parts list database;
   wherein said parts list control section permits, limits or prohibits operations of changing said part number or said part data, based on said status data, and controls operations of changes of said part number and said part data in said parts list, based on said status data; and
   wherein the process of design change includes a stage of modifying a design of said part a stage of inspecting a CAD figure of said part, a stage of inspecting said part number and a stage of formalizing said design change.

2. The parts list system according to claim 1, further comprising:
   a CAD figure control section which generates or modifies a CAD figure of said part based on data regarding said design change, and extracts said part number and attribute data indicating properties of said part, wherein said CAD figure includes said part number and said attribute data;
   wherein said parts list control section makes said part data in said parts list database include the extracted attribute data, which is related to said part number.

3. The parts list system according to claim 2, further comprising:
   a display section which displays said parts list in a display;
   wherein said parts list control section controls said parts list to be displayed as a tabular form in said display, and controls said part number, said status data and said part data of said part to be displayed in one row in said tabulated parts list.

4. The parts list system according to claim 2, wherein said part data of said parts list are related to said CAD figure data by said part number.

5. The parts list system according to claim 1, wherein said parts list control section generates said status data based on a combination of a plurality of data indicating statuses of said process of said design change.

6. The parts list system of claim 1 wherein the part data of the parts list database comprises a hierarchical structure relating related parts within the apparatus, and wherein individual hierarchical levels are designated, and wherein the hierarchical level of each part is related to the part number within the parts list database.

7. The parts list system of claim 1 wherein the parts list system further comprises
   a CAD figure database, the CAD figure data base comprising CAD data of parts, and comprising relational storage by part number of part shape data, part position within the assembly data, and CAD figure data;
   a CAD figure requirement database comprising predetermined standard requirements of the CAD drawings; and
   a CAD figure control section,
   wherein when the CAD figure is revised, the revised figure is checked by the CAD figure control section which inspects whether or not the CAD figure complies with the requirements set forth in the CAD figure requirement database.

8. A parts list generating method comprising the steps of:
   (a) modifying a CAD figure of a part of an apparatus based on data regarding a design change, wherein said CAD figure includes a part number of said part and attribute date indicating properties of said part;
   (b) extracting said part number and said attribute data based on said CAD figure, and storing said attribute data at places of a parts list related to said part number, wherein said parts list relates said part number, part data including said attribute data and indicating properties of said part, and a status data indicating each stage of a process of a design change of said part of said apparatus; and
   (c) inspecting said CAD figure for satisfying a predetermined requirement and changing said status data of said part in said parts list to a first status when said CAD figure satisfies said predetermined requirement, wherein said first status indicates that a deletion of said part number in said parts list is prohibited,
   wherein the process of design change includes at least the following stages: a stage of modifying a design of said part, a stage of inspecting said CAD figure, a stage of inspecting said part number and a stage of formalizing said design change; and
   wherein operations of changing said part number or said part data are permitted limited or prohibited based on said as data.

9. The parts list generating method according to claim 8, further comprising the steps of:
   (d) confirming a relation between said part and an item which is equipment of said apparatus including said part, wherein said relation is indicated in an application data included in said part data; and
   (e) changing said status data of said part in said parts list to a second status, wherein said second status indicates that a change of said application data in said parts list is prohibited.

10. The parts list generating method according to claim 9, further comprising the steps of:
    (f) grouping said part and other parts different from said part, wherein a group of said part and said other parts is predetermined and CAD figures of said part and said other parts are inspected at the same time, said other parts have already been processed in said steps (a) to (e); and (g) changing said status data of said part in said parts list to a third status, wherein said third status indicates that a deletion, an addition and a change of said part number in said parts list is prohibited.

11. The parts list generating method according to claim 10, further comprising the steps of:

(h) inspecting part numbers of said part and said other parts included in said group for satisfying a predetermined rule; and (i) outputting said CAD figures of said part and said other parts for inspections and changing said status data of said part and said other parts in said parts list to a fourth status when said part numbers satisfy said predetermined rule, wherein said fourth status indicates that said CAD figures of said part and said other parts are in said inspection.

12. The parts list generating method according to claim 11, further comprising the step of:

(j) changing said status data of said part and said other parts in said parts list to a fifth status when said CAD figures of said part and said other parts pass said inspections, wherein said fifth status indicates that said part, said other parts and said CAD figures of said part and said other parts are formally registered, and that a change of said part numbers or said CAD figures is prohibited.

13. The parts list generating method according to claim 8, wherein said status data is generated based on a combination of a plurality of data indicating statuses of said process of said design change.

14. A computer-readable medium having a computer program saved thereupon, said computer program comprising the operations of:

(a) modifying a CAD figure of a part of an apparatus based on data regarding a design change, wherein said CAD figure includes a part number of said part and attribute data indicating properties of said part;

(b) extracting said part number and said attribute data based on said CAD figure, and storing said attribute data at places of a parts list related to said part number, wherein said parts list relates said part number, part data including said attribute data and indicating properties of said part, and a status data indicating each stage of a process of a design change of said part of said apparatus; and (c) inspecting said CAD figure for satisfying a predetermined requirement and changing said status data of said part in said parts list to a first status when said CAD figure satisfies said predetermined requirement, wherein said first status indicates that a deletion of said part number in said parts list is prohibited, wherein the process of design change includes at least the following stages: a stage of modifying a design of said part, a stage of inspecting said CAD figure, a state of inspecting said part number and a stage of formalizing said design change; and wherein operations of changing said part number or said part data are permitted limited or prohibited based on said status data.

15. The computer-readable medium according to claim 14, wherein said computer program further comprises the operations of:

(d) confirming a relation between said part and an item which is equipment of said apparatus including said part, wherein said relation is indicated in an application data included in said part data; and (e) changing said status data of said part in said parts list to a second status, wherein said second status indicates that a change of said application data in said parts list is prohibited.

16. The computer-readable medium according to claim 15, wherein said computer program further comprises the operations of:

(f) grouping said part and other parts different from said part, wherein a group of said part and said other parts is predetermined and CAD figures of said part and said other parts are inspected at the same time, said other parts have already been processed in said operations to; and (g) changing said status data of said part in said parts list to a third status, wherein said third status indicates that a deletion, an addition and a change of said part number in said parts list is prohibited.

17. The computer-readable medium according to claim 16, wherein said computer program further comprises the operations of:

(h) inspecting part numbers of said part and said other parts included in said group for satisfying a predetermined rule; and (j) outputting said CAD figures of said part and said other parts for inspections and changing said status data of said part and said other parts in said parts list to a fourth status when said part numbers satisfy said predetermined rule, wherein said fourth status indicates that said CAD figures of said part and said other parts are in said inspection.

18. The computer-readable medium according to claim 17, wherein said computer program further comprises the operation of:

(j) changing said status data of said part and said other parts in said parts list to a fifth status when said CAD figures of said part and said other parts pass said inspections, wherein said fifth status indicates that said part, said other parts and said CAD figures of said part and said other parts are formally registered, and that a change of said part numbers or said CAD figures is prohibited.

19. The computer-readable medium according to claim 14, wherein said status data is generated based on a combination of a plurality of data indicating statuses of said process of said design change.

* * * * *

UNITED STATES PATENT AND TRADEMARK OFFICE
CERTIFICATE OF CORRECTION

PATENT NO. : 6,944,515 B2  Page 1 of 1
DATED : September 13, 2005
INVENTOR(S) : Mamoru Nakajima et al.

It is certified that error appears in the above-identified patent and that said Letters Patent is hereby corrected as shown below:

<u>Column 3,</u>
Line 19, change "The step p(f) group" to -- The step p(f) groups --.

<u>Column 16,</u>
Line 52, change "data are permitted limited or prohibited based on said data" to
-- data or permitted, limited or prohibited based on said status data --.

Signed and Sealed this

Second Day of May, 2006

JON W. DUDAS
*Director of the United States Patent and Trademark Office*